Dec. 9, 1969  C. J. MELECH  3,482,901
OPTICAL PROJECTION SYSTEM
Filed May 20, 1968  2 Sheets-Sheet 1

CHARLES J. MELECH
INVENTOR.

BY William F. Delaney Jr.
Robert W. Hampton
ATTORNEYS 3,482,901
OPTICAL PROJECTION SYSTEM
Charles J. Melech, Rochester, N.Y., assignor to Eastman
Kodak Company, Rochester, N.Y., a corporation of
New Jersey
Filed May 20, 1968, Ser. No. 730,443
Int. Cl. G02b *17/00, 9/00, 9/62*
U.S. Cl. 350—203      6 Claims

ABSTRACT OF THE DISCLOSURE

An optical projection system for reading and copying documents at a variable magnification and at a variable angle of image rotation is disclosed, in which a collimator and prism are combined with one of several projection objectives. The prism provides a means for rotating the image with respect to the object. Each objective is a four component, seven element lens with an outside stop which permits the location of the prism adjacent the diaphragm.

CROSS-REFERENCE TO A RELATED APPLICATION

Reference is made to commonly assigned copending U.S. patent application Ser. No. 730,316 entitled "Image Projection System," filed May 20, 1968 in the name of Robert P. Crandall.

BACKGROUND OF THE INVENTION

This invention relates to optical systems for projecting magnified images of documents and, more particularly to such systems adapted for rotating and for varying the magnification of the projected image.

Objectives used for projecting magnified images are often combined with a collimator and rotatable dove prism for rotating the image with respect to the object. The collimator and the objective each work substantially at an infinite conjugate, and light passing through the system from any point in the object plane is substantially parallel between these two members. The prism is located in this parallel light to introduce a reflective surface into the system. Rotation of the prism about the optical axis of the system rotates the image with respect to the object at twice the rate of the prism rotation. The prism must be sufficiently large to accommodate the field of the objective, and it is usually the most expensive component in the system. In addition, an objective used for document copying must be of exceptional quality to provide the necessary resolution. Such systems can be designed with a high degree of optical quality, but it is difficult to maintain such quality when the system is required to magnify the image at a variable power.

SUMMARY OF THE INVENTION

It is an object of this invention to provide an improved system for reading and/or copying documents, for rotating the projected image with respect to the object and for magnifying the image by a widely variable power.

According to this invention, a projection system is provided comprising a collimator and a prism in combination with any selected one of several front-stop objectives, each consisting of seven elements combined in four components. Each of these objectives comprises, from front (i.e. the long conjugate side) to rear, a front positive meniscus element, a positive meniscus doublet, a biconcave negative element, and a positive triplet containing an airspace. The positive meniscus doublet of each objective comprises a front biconvex element and a rear biconcave element, and the airspaced triplet of each objective comprises two biconvex outer elements and a biconcave inner element with the front two elements airspaced. The use of front-stop objectives permits the location of the prism adjacent the stop. Consequently, the size of the prism can be minimized since the aperture is smallest near the stop.

The system magnifies the image with respect to the object by a factor which is dependent upon the ratio of the conjugate distances. Accordingly, the magnification can be varied by moving the image plane with respect to the system through an axial range including the focal plane of the collimator, and then moving the system through a smaller range to focus the image. The latter range must be sufficiently small to avoid destroying the parallelism of light transmitted through the prism, and this limits the range of magnification powers obtainable with any one objective. This range can be extended by substituting other objectives having different focal lengths. Each of the objectives could be a scaled version of the same lens design, but this would result in a similarly scaled aperture. Consequently, the objectives of this invention are slightly different to enable the shorter focal length objectives to have a larger relative aperture, thus permitting a constant numerical aperture at the long conjugate for all objectives.

DETAIL DESCRIPTION OF THE DRAWINGS

Figure 1:
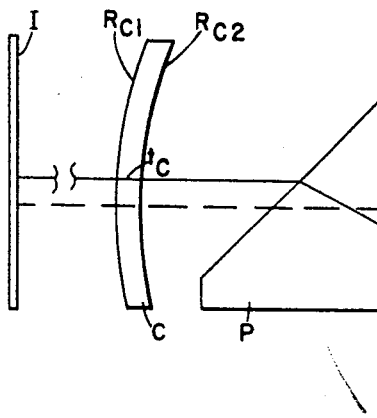
FIG. 1 shows a cross-section of a projection system according to the invention, including a collimator, a prism and an objective with its long conjugate on the left.

The optical system of FIG. 1 forms a magnified image in an image plane I of an object in an object plane O, and includes a collimator C and a dove prism P in combination with an objective comprising four components I–IV, including seven elements $L_{1-7}$. Component I is a simple meniscus positive element concave to the rear, i.e. the short conjugate side of the objective. Component II is a meniscus positive doublet concave to the rear consisting of a front biconvex and a rear biconcave element. Component III is a simple negative biconcave element. Component IV is a triplet comprising two outer biconcave elements and an inner biconcave element with the front two elements being airspaced.

Numerial data for constructing a collimator having a focal length of 1228.69 mm. for use in a system according to the invention is given in the following table.

| Element | $N_D$ | V | Radii (mm.) | Thickness (mm.) |
|---|---|---|---|---|
| C | 1.516 | 64.1 | $R_{C1}=513.9$ | $T_C=6.22$ |
|   |       |      | $R_{C2}=2,696.0$ |               |

Although the collimator has a focal length of 1228.69 mm., it can be spaced from the image plane by a distance which ranges from 859.0 mm. to 1246.83 mm. This variation in image plane location with respect to the focal plane of the collimator changes the magnification and focus of the image, but the entire optical sytem can be moved slightly with respect to the object plane to bring the image into focus.

The dove prism located between the collimator C and the objective can be mounted for rotation about the optical axis of the objective to rotate the image with respect to the object. Light passing through the prism form any point in the object plane O is substantially parallel, since the object plane is located substantialy in the focal plane of the objective. Parallel light from the objective is refracted at an inclined surface of the prism, reflected at its base and refracted again as it passes out of the opposite inclined plane of the prism, from which it is transmitted as parallel light to the collimator which forms an image in the mage plane I. If desired the collimator and/or the objective can be mounted for rotation together with the prism, since the axis of rotation of the prism coincides with the optical axes of the objectve and collimator.

According to one embodiment of the invention in FIG. 1, the prism is formed of a glass having an index of refraction for the D line of the spectrum of 1.72 and an index of dispersion of 29.5. The prism has base angles of 45° and its longer base is 97.5 mm. It is 34.0 mm. in height and its longer base is located parallel to, and 7.0 mm. below, the optical axis of the objective. A paraxial ray from the objective entering the prism of 7.0 mm. above the base leaves the prism 19.1 mm. above the base, and is incident upon the collimator 12.1 mm. above the axes of the collimator. The collimator and objective are mounted coaxially to avoid translational motion of the image as it is rotated. Therefore, the axis of the objective is displaced by the prism from the optical axis of the collimator. This displacement permits a significant reduction in prism size, and consequently in collimator diameter, thus providing compactness and economy with negligible loss in quality. The aberrations introduced by this displacement are not significant because the collimator has a weak power.

Numerical data for constructing objective lenses having an equivalent focal length of 100 mm. for use in projection systems according to this invention is given in the following table of parameter ranges, in which the lens elements are numbered from the front (i.e. long conjugate side), $N_D$ is the index of refraction of each element for the D line, V is the index of dispersion, and R, T and S refer respectively to the radii of curvature of the lens surfaces, the thicknesses of the lens elements and the airspaces between the elements, numbered by subscript from front to read:

| Elements | $N_A$ | V | Radii (mm.) | Thicknesses and Spacings (mm.) |
|---|---|---|---|---|
| I | 1.730 to 1.760 | 50 to 52 | $R_1=51$ to 58 | $t_1=8$ to 12 |
|   |                |          | $R_2=230$ to 255 | $S_1=.9$ to 2.1 |
| II | 1.690 to 1.700 | 55 to 57 | $R_3=73$ to 76 | $t_2=10$ to 12 |
|    |                 |           | $R_4=-179$ to $-202$ | $t_3=3$ to 4 |
| III | 1.616 to 1.690 | 36 to 37 | $R_5=96$ to 102 | $S_2=3$ to 5 |
| IV | 1.680 to 1.690 | 30 to 32 | $R_6=-197$ to $-203$ | $t_4=5$ to 7 |
|    |                 |           | $R_7=35$ to 40 | $S_3=6$ to 9 |
| V | 1.730 to 1.760 | 50 to 52 | $R_8=342$ to 363 | $t_5=11$ to 13 |
|   |                |          | $R_9=-51$ to $-53$ | $S_4=2$ to 3 |
| VI | 1.570 to 1.580 | 41 to 42 | $R_{10}=-37$ to $-41$ | $t_6=5$ to 6 |
| VII | 1.770 to 1.790 | 44 to 45 | $R_{11}=56$ to 60 | $t_7=2$ to 22 |
|     |                 |          | $R_{12}=-73$ to $-76$ |  |

Preferred embodiments of the objective lenses having equivalent focal lengths of 100 mm. for use in projection systems according to the invention are given in the four examples below.

objective alone is less than .06%, the sagittal and tangential fields of the above objective vary less than .3% of the focal length of the objective, and distortion is approximately 1%.

EXAMPLE 1

| Elements | $N_D$ | V | Radii (mm.) | Thicknesses and Spacings (mm.) |
|---|---|---|---|---|
| I | 1.73388 | 51.3 | $R_1 = 51.133$ | $t_1 = 8.34$ |
|  |  |  | $R_2 = 232.014$ | $S_1 = 2.09$ |
| II | 1.69669 | 55.6 | $R_3 = 74.098$ | $t_2 = 10.34$ |
|  |  |  | $R_4 = -196.281$ |  |
| III | 1.61644 | 36.6 | $R_5 = 99.117$ | $t_3 = 3.53$ |
|  |  |  |  | $S_2 = 3.72$ |
| IV | 1.68873 | 31.1 | $R_6 = -196.281$ | $t_4 = 5.99$ |
|  |  |  | $R_7 = 35.958$ | $S_3 = 8.11$ |
| V | 1.73388 | 51.3 | $R_8 = 342.044$ | $t_5 = 12.47$ |
|  |  |  | $R_9 = -51.498$ | $S_4 = 2.58$ |
| VI | 1.57489 | 41.3 | $R_{10} = -37.789$ | $t_6 = 5.53$ |
| VII | 1.78574 | 44.0 | $R_{11} = 56.527$ | $t_7 = 21.25$ |
|  |  |  | $R_{12} = -73.141$ |  |

EXAMPLE 2

| Elements | $N_D$ | V | Radii (mm.) | Thicknesses and Spacings (mm.) |
|---|---|---|---|---|
| I | 1.73388 | 51.3 | $R_1 = 55.893$ | $t_1 = 10.96$ |
|  |  |  | $R_2 = 248.344$ | $S_1 = 2.04$ |
| II | 1.69669 | 55.6 | $R_3 = 73.370$ | $t_2 = 11.41$ |
|  |  |  | $R_4 = -179.767$ |  |
| III | 1.61644 | 36.6 | $R_5 = 96.548$ | $t_3 = 3.89$ |
|  |  |  |  | $S_2 = 4.00$ |
| IV | 1.68873 | 31.1 | $R_6 = -197.611$ | $t_4 = 5.96$ |
|  |  |  | $R_7 = 38.304$ | $S_3 = 6.19$ |
| V | 1.73388 | 51.3 | $R_8 = 353.611$ | $t_5 = 11.96$ |
|  |  |  | $R_9 = -51.659$ | $S_4 = 2.33$ |
| VI | 1.57489 | 41.3 | $R_{10} = -39.226$ | $t_6 = 5.52$ |
| VIII | 1.78574 | 44.0 | $R_{11} = 57.789$ | $t_7 = 2.09$ |
|  |  |  | $R_{12} = -74.059$ |  |

The objective described above as Example I is particularly adapted for use with the collimator and prism described above, if the objective is constructed at a focal length of 43.05 mm. working at a maximum relative aperture of $f/3.2$. The system using this objective has a magnification range of 20.3× to 28.5× with the long conjugate of the system varying from 859.0 mm. to 1229.66 mm. and with the short conjugate being adjusted for focus from 23.09 mm. to 22.45 mm.

Figure 2:
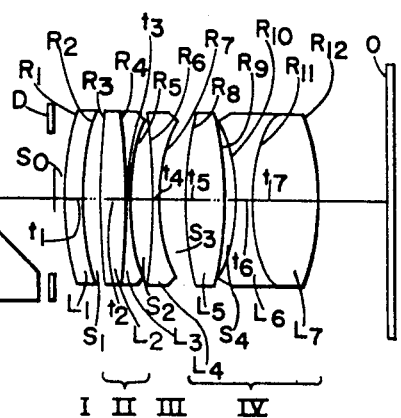
FIG. 2 shows a set of curves for the system using the objective disclosed in Example 1 below, depicting the energy distribution of light rays passing through the system at half-field angles of 0°, 6°05′, 9°05′, 11°18′, 13°30′ and 14°56′, all at an aperture of $f/3.2$ and a magnification factor of 20.3.
Figure 2:
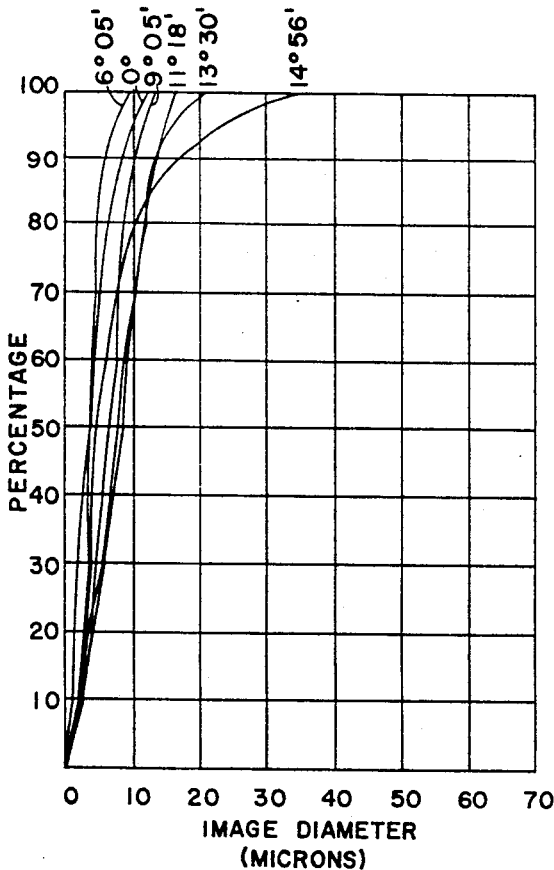

The curves shown in FIG. 2 are a particularly pertinent criterion of lens performance because they represent the result of tracing hundreds of rays through the projection system from point sources at different field angles. The rays traced represent the three primary colors. The quality of the system is measured by plotting the percentage of light rays from each point source which are imaged in a spot on the image plane versus the size of the spot. Thus the curves for different field angles give an accurate analysis of optical performance.

As shown by the curves in FIG. 2, the above system gives exceptionally high resolution. For example, it will be seen that approximately 85% of all the light rays within a field angle of 14°56' are imaged by the system within a spot having a diameter of 15 microns, when the system is used at a magnification power of 20.3. More specifically, when the lens is used at this magnification power, the resolution ranges from approximately 112 lines per mm. at the center of the image area to 62 lines per mm. at the edges.

Figure 3A:
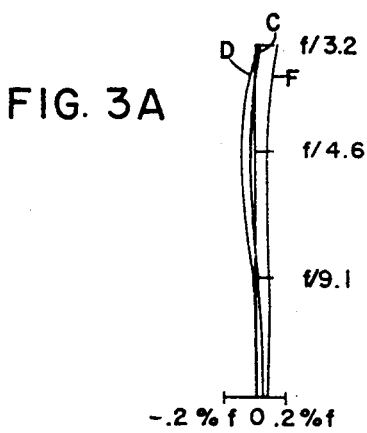
FIG. 3 shows a set of correction curves for the system using the objective disclosed in Example 1 below, showing (A) spherical aberration curves for the C, D and F lines of the spectrum, and (B) curves for sagittal and tangential astigmatism.
Figure 3B:
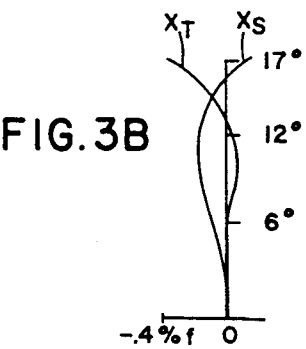

As shown by the curves in FIG. 3, a projection system according to the invention using the above objective in Example 1 is corrected to such a degree that spherical aberration for the D line of the spectrum is less than .2% of the focal length of the objective, and the sagittal and tangential fields vary less than .4% of the focal length. Distortion is less than .03%. Although the complete system is well corrected for aberrations as described above, the objective by itself is also a well-corrected lens. The maximum spherical aberration for the D line due to the When the above objective, constructed at a focal length of 32.63 mm., is used with the collimator and prism described above, the system can operate at a magnification power ranging from 26.9× to 37.6× with the long conjugate distance of the system varying from 861.0 mm. to 1229.66 mm. and with the short conjugate distance varying for focusing from 16.89 mm. to 16.53 mm.

When the above collimator and prism are used with the above objective constructed at a focal length of 27.0 mm., the system operates at a magnification range of 33.1× to 46.1× with the long conjugate distance of the system varying from 876.71 mm. to 1246.83 mm. and the short conjugate varying for focusing from 13.92 mm. to 13.68 mm. This objective is used at shorter focal lengths than the objective in the first example, and it was redesigned slightly to provide a larger maximum relative aperture of $f/2$.

Figure 4:
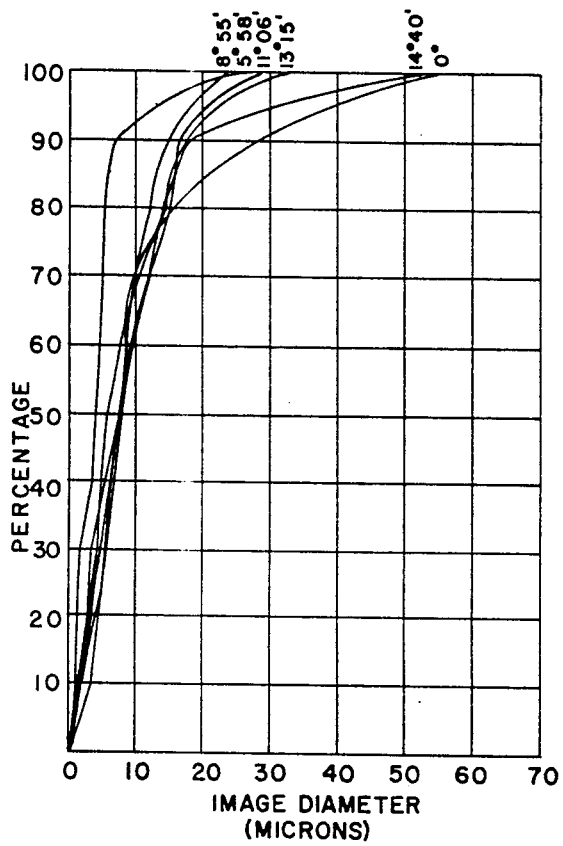
FIG. 4 shows a set of curves for the system using the objective disclosed in Example 2 below, depicting the energy distribution of light rays passing through the system at half-field angles of 0°, 5°58′, 8°55′ 11°06′, 13°15′ and 14°40′, all at an aperture of $f/2.0$ and a magnification factor of 33.1.

FIG. 4 shows energy distribution curves for the projection system using the objective in Example 2, above. The significance of these curves have been explained above in relation to FIG. 2. The curves in FIG. 4 indicate that this system also gives exceptionally high resolution. For example, it will be seen that approximately 78% of all the light rays within the field of 14°40' are imaged by the lens within a spot having a diameter of 15 microns.

Figure 5A:
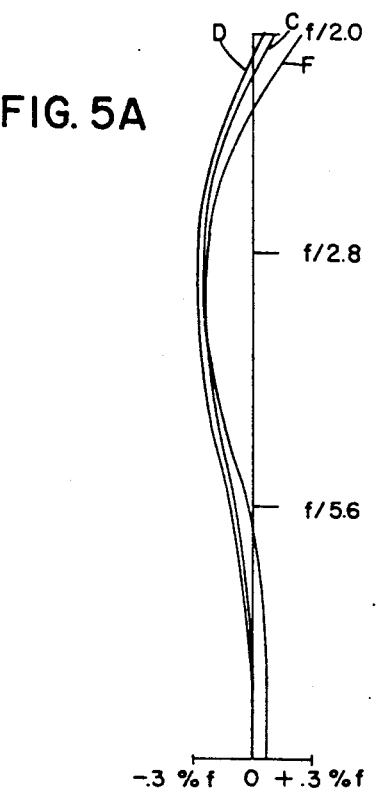
FIG. 5 comprises a set of correction curves for the system using the objective disclosed in Example 2 below, showing (A) spherical aberration curves for the C, D and F lines of the spectrum, and (B) curves for sagittal and tangential astigmatism.
Figure 5B:
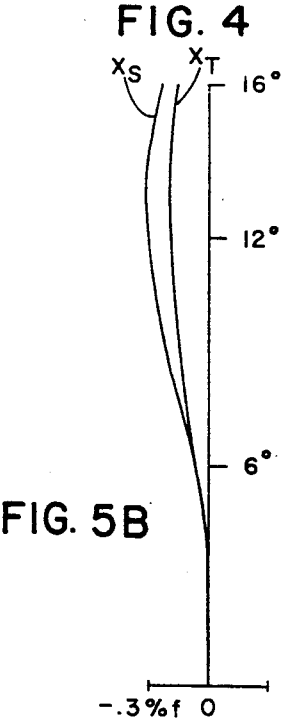

As shown by the curves in FIG. 5 a projection system according to the invention including the objective lens in Example 2 is corrected to such a degree that spherical aberration and the sagittal and tangential fields are all less than .3% of the objective focal length. Distortion is less than .8%. As was the case with the objective in Example 1, this objective is also well corrected for all aberrations with or without the collimator and prism. When this objective is used by itself, the spherical aberration for the D line is approximately .1% $f$, the sagittal and tangential fields vary less than .05% $f$, and distortion is approximately .08%.

EXAMPLE 3

| Elements | $N_D$ | V | Radii (mm.) | Thicknesses and Spacings (mm.) |
|---|---|---|---|---|
| I | 1.75300 | 50.6 | $R_1=57.395$ | $t_1=11.22$ |
|   |         |      | $R_2=254.260$ | $S_1=0.95$ |
| II | 1.69680 | 56.2 | $R_3=75.109$ | $t_2=11.68$ |
| III | 1.61700 | 36.6 | $R_4=-184.174$ | $t_3=4.01$ |
|   |         |      | $R_5=98.900$ | $S_2=4.11$ |
| IV | 1.68900 | 30.9 | $R_6=-202.348$ | $t_4=6.10$ |
|    |         |      | $R_7=39.280$ | $S_3=7.81$ |
| V | 1.75300 | 50.6 | $R_8=362.856$ | $t_5=12.26$ |
|   |         |      | $R_9=-52.881$ | $S_4=2.42$ |
| VI | 1.57500 | 41.4 | $R_{10}=-40.267$ | $t_6=5.67$ |
| VII | 1.77670 | 44.7 | $R_{11}=59.298$ | $t_7=21.39$ |
|     |         |      | $R_{12}=-75.936$ |   |

| Elements | $N_D$ | V | Radii (mm.) | Thicknesses and Spacings (mm.) |
|---|---|---|---|---|
| I | 1.75300 | 50.6 | $R_1=52.530$ | $t_1=8.57$ |
|   |         |      | $R_2=238.351$ | $S_1=.98$ |
| II | 1.69680 | 56.2 | $R_3=76.121$ | $t_2=10.62$ |
| III | 1.61700 | 36.6 | $R_4=-201.642$ | $t_3=3.65$ |
|   |         |      | $R_5=101.823$ | $S_2=4.39$ |
| IV | 1.68900 | 30.9 | $R_6=-201.642$ | $t_4=6.16$ |
|    |         |      | $R_7=36.941$ | $S_3=8.34$ |
| V | 1.75300 | 50.6 | $R_8=351.382$ | $t_5=12.82$ |
|   |         |      | $R_9=-52.904$ | $S_4=2.65$ |
| VI | 1.57500 | 41.4 | $R_{10}=-38.820$ | $t_6=5.67$ |
| VII | 1.77670 | 44.7 | $R_{11}=58.072$ | $t_7=21.84$ |

An apparatus for mounting the optical system of this invention is described in commonly assigned copending U.S. patent application Ser. No. 730,316 entitled "Image Projection System," filed May 20, 1968 in the name of Robert P. Crandall. The apparatus described in the Crandall application provides means for selectively mounting any one of the above objectives in optical alignment with the collimator on the opposite side of the prism. The prism and collimator are mounted for rotation about the optical axis of the objective and the entire optical system is mounted for axial adjustment to focus the image when the long conjugate distance is varied by a movable mirror system. The apparatus automatically moves the lens system to its best focus position in response to a change in position of the image plane on the long conjugate side of the system. Such a system could also include means for automatically adjusting the illumination of the object according to which of the objectives is included in the system.

The invention has been described in detail with particular reference to preferred embodiments thereof, but it will be understood that variations and modifications can be effected within the spirit and scope of the invention as described hereinabove.

I claim:

1. An optical objective having an equivalent focal length of 100 mm. comprising in spaced optical alignment from front to rear, a front positive meniscus element, a positive meniscus doublet, a biconcave element, and a positive triplet containing an airspace, wherein the elements are constructed substantially according to the following ranges of parameters, in which the lens elements are numbered from the front, $N_D$ is the index of refraction for the D line of the spectrum, V is the index of dispersion and R, T and S refer respectively to the radii of curvature of the lens surfaces, the axial thicknesses of the lens elements and the axial spacings between the lens elements, numbered by subscript from front to rear:

| Elements | $N_A$ | V | Radii (mm.) | Thicknesses and Spacings (mm.) |
|---|---|---|---|---|
| I | 1.730 to 1.760 | 50 to 52 | $R_1=51$ to 58 | $t_1=8$ to 12 |
|   |                |          | $R_2=230$ to 255 | $S_1=.9$ to 2.1 |
| II | 1.690 to 1.700 | 55 to 57 | $R_3=73$ to 76 | $t_2=10$ to 12 |
| III | 1.616 to 1.617 | 36 to 37 | $R_4=-179$ to $-202$ | $t_3=3$ to 4 |
|     |                |          | $R_5=96$ to 102 | $S_2=3$ to 5 |
| IV | 1.680 to 1.690 | 30 to 32 | $R_6=-197$ to $-203$ | $t_4=5$ to 7 |
|    |                |          | $R_7=35$ to 40 | $S_3=6$ to 9 |
| V | 1.730 to 1.760 | 50 to 52 | $R_8=342$ to 363 | $t_5=11$ to 13 |
|   |                |          | $R_9=-51$ to $-53$ | $S_4=2$ to 3 |
| VI | 1.570 to 1.580 | 41 to 42 | $R_{10}=-37$ to $-41$ | $t_6=5$ to 6 |
| VII | 1.770 to 1.790 | 44 to 45 | $R_{11}=56$ to 60 | $t_7=2$ to 22 |
|     |                |          | $R_{12}=-73$ to $-76$ | |

2. An optical projection system including a front collimating component, a rotatable dove prism for rotating an image with respect to an object, and an objective as claimed in claim 1.

3. An optical objective having an equivalent focal length of 100 mm. comprising in spaced optical alignment from front to rear, a front positive meniscus element, a positive meniscus doublet, a biconcave element, and a positive triplet containing an airspace, wherein the elements have the substantially following characteristics and spacial relations, in which the lens elements are numbered from the front, $N_D$ is the index of refraction for the D line of the spectrum, V is the index of dispersion and R, T and S refer respectively to the radii of curvature of the lens surfaces, the axial thicknesses of the lens elements and the axial spacings between the lens elements, numbered by subscript from front to rear:

| Elements | $N_D$ | V | Radii (mm.) | Thicknesses and Spacings (mm.) |
|---|---|---|---|---|
| I | 1.734 | 51.3 | $R_1=51.,3$ | $t_1=8.34$ |
|  |  |  | $R_2=232.0$ | $S_1=2.09$ |
| II | 1.697 | 55.6 | $R_3=74.10$ | $t_2=10.24$ |
| III | 1.616 | 36.6 | $R_4=196.3$ | $t_3=3.53$ |
|  |  |  | $R_5=99.12$ | $S_2=2.72$ |
| IV | 1.689 | 31.1 | $R_6=-196.3$ | $t_4=5.99$ |
|  |  |  | $R_7=35.96$ | $S_3=8.11$ |
| V | 1.734 | 51.3 | $R_8=342.0$ | $t_5=12.47$ |
|  |  |  | $R_9=-51.50$ | $S_4=2.58$ |
| VI | 1.575 | 41.3 | $R_{10}=-37.79$ | $t_6=5.53$ |
| VII | 1.786 | 40.0 | $R_{11}=56.53$ | $t_7=21.25$ |
|  |  |  | $R_{12}=-73.14$ |  |

4. An optical objective having an equivalent focal length of 100 mm. comprising in spaced optical alignment from front to rear, a front positive meniscus element, a positive meniscus doublet, a biconcave element, and a positive triplet containing an airspace, wherein the elements have the substantially following characteristics and spacial relations, in which the lens elements are numbered from the front, $N_D$ is the index of refraction for the D line of the spectrum, V is the index of dispersion and R, T and S refer respectively to the radii of curvature of the lens surfaces, the axial thicknesses of the lens elements and the axial spacings between the lens elements, numbered by subscript from front to rear:

| Elements | $N_D$ | V | Radii (mm.) | Thicknesses and Spacings (mm.) |
|---|---|---|---|---|
| I | 1.734 | 51.3 | $R_1=55.89$ | $t_1=10.96$ |
|  |  |  | $R_2=248.3$ | $S_1=2.04$ |
| II | 1.697 | 55.6 | $R_3=73.37$ | $t_2=11.41$ |
| III | 1.616 | 36.6 | $R_4=179.8$ | $t_3=3.89$ |
|  |  |  | $R_5=96.55$ | $S_2=4.00$ |
| IV | 1.689 | 31.1 | $R_6=-197.6$ | $t_4=5.96$ |
|  |  |  | $R_7=38.30$ | $S_3=6.19$ |
| V | 1.734 | 51.3 | $R_8=353.6$ | $t_5=11.96$ |
|  |  |  | $R_9=-51.66$ | $S_4=2.33$ |
| VI | 1.575 | 41.3 | $R_{10}=-39.23$ | $t_6=5.52$ |
| VII | 1.786 | 44.0 | $R_{11}=57.79$ | $t_7=2.09$ |
|  |  |  | $R_{12}=-74.06$ |  |

5. An optical objective having an equivalent focal length of 100 mm. comprising in spaced optical alignment from front to rear, a front positive meniscus element, a positive meniscus doublet, a biconcave element, and a positive triplet containing an airspace, wherein the elements have the substantially following characteristics and spacial relations, in which the lens elements are numbered from the front, $N_D$ is the index of refraction for the D line of the spectrum, V is the index of dispersion and R, T and S refer respectively to the radii of curvature of the lens surfaces, the axial thicknesses of the lens elements and the axial spacings between the lens elements, numbered by subscript from front to rear:

| Elements | $N_D$ | V | Radii (mm.) | Thicknesses and Spacings (mm.) |
|---|---|---|---|---|
| I | 1.753 | 50.6 | $R_1=57.40$ | $t_1=11.22$ |
|  |  |  | $R_2=254.3$ | $S_1=0.95$ |
| II | 1.697 | 56.2 | $R_3=75.11$ | $t_2=11.68$ |
| III | 1.617 | 36.6 | $R_4=-184.2$ | $t_3=4.01$ |
|  |  |  | $R_5=98.90$ | $S_2=4.11$ |
| IV | 1.689 | 30.9 | $R_6=-202.3$ | $t_4=6.10$ |
|  |  |  | $R_7=39.28$ | $S_3=7.81$ |
| V | 1.753 | 50.6 | $R_8=362.9$ | $t_5=12.26$ |
|  |  |  | $R_9=-52.88$ | $S_4=2.42$ |
| VI | 1.575 | 41.4 | $R_{10}=-40.27$ | $t_6=5.67$ |
| VII | 1.777 | 44.7 | $R_{11}=59.30$ | $t_7=21.39$ |
|  |  |  | $R_{12}=-75.95$ |  |

6. An optical objective having an equivalent focal length of 100 mm. comprising in spaced optical alignment from front to rear, a front positive meniscus element, a positive meniscus doublet, a biconcave element, and a positive triplet containing an airspace, wherein the elements have the substantially following characteristics and spacial relations, in which the lens elements are numbered from the front, $N_D$ is the index of refraction for the D line of the spectrum, V is the index of dispersion and R, T and S refer respectively to the radii of curvature of the lens surfaces, the axial thicknesses of the lens elements and the axial spacings between the lens elements, numbered by subscript from front to rear:

| Elements | $N_D$ | V | Radii (mm.) | Thicknesses and Spacing (mm.) |
|---|---|---|---|---|
| I | 1.753 | 50.6 | $R_1=52.53$ | $t_1=8.57$ |
|  |  |  | $R_2=238.4$ | $S_1=.98$ |
| II | 1.697 | 56.2 | $R_3=76.12$ | $t_2=10.62$ |
| III | 1.617 | 36.6 | $R_4=-201.6$ | $t_3=3.65$ |
|  |  |  | $R_5=101.8$ | $S_2=4.39$ |
| IV | 1.689 | 30.9 | $R_6=-201.6$ | $t_4=6.16$ |
|  |  |  | $R_7=36.94$ | $S_3=8.34$ |
| V | 1.753 | 50.6 | $R_8=351.4$ | $t_5=12.82$ |
|  |  |  | $R_9=-52.90$ | $S_4=2.65$ |
| VI | 1.575 | 41.4 | $R_{10}=-38.82$ | $t_6=5.67$ |
| VII | 1.777 | 44.7 | $R_{11}=58.07$ | $t_7=21.84$ |
|  |  |  | $R_{12}=-75.14$ |  |

References Cited

UNITED STATES PATENTS 3,360,325  12/1967  Gustafson.

DAVID SCHONBERG, Primary Examiner

PAUL A. SACHER, Assistant Examiner

U.S. Cl. X.R.

350—214, 215

PO-1050
(5/69)

UNITED STATES PATENT OFFICE
CERTIFICATE OF CORRECTION

Patent No. 3,482,901　　　　　　　　Dated July 23, 1970

Inventor(s) Charles J. Melech

It is certified that error appears in the above-identified patent and that said Letters Patent are hereby corrected as shown below:

| Column and line in Printed Patent | Page or Claim and Line in Application | Mistake Noted |
|---|---|---|
| Col. 9, line 22 | Claim 3, line 15 | "$R_1=51,3$" should be -- $R_1=51.13$ --. |
| Col. 9, line 27 | Claim 3, line 21 | "$R_4=196.3$" should be -- $R_4=-196.3$ --. |
| Col. 9, line 29 | Claim 3, line 24 | "$S_2=2.72$" should be -- $S_2=3.72$ --. |
| Col. 9, line 38 | Claim 3, line 36 | "40.0" should be -- 44.0 --. |
| Col. 9, line 61 | Claim 4, line 21 | "$R_4=179.8$" should be -- $R_4=-179.8$ --. |
| Col. 10, line 31 | Claim 5, line 37 | "$R_{12}=-75.95$" should be -- $R_{12}=-75.94$ --. |
| Col. 10, line 47 | Claim 6, line 14 | "Spacing" should be -- Spacings --. |

SIGNED AND SEALED
OCT 13 1970

(SEAL)
Attest:

Edward M. Fletcher, Jr.
Attesting Officer

WILLIAM E. SCHUYLER, JR.
Commissioner of Patents